United States Patent
Yao et al.

(10) Patent No.: US 8,003,024 B2
(45) Date of Patent: Aug. 23, 2011

(54) POLYOLEFIN CONTACT LENS MOLDS AND USES THEREOF

(75) Inventors: Li Yao, Pleasanton, CA (US); Xuxian Niu, Pleasanton, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 146 days.

(21) Appl. No.: 11/855,376

(22) Filed: Sep. 14, 2007

(65) Prior Publication Data

US 2008/0067702 A1    Mar. 20, 2008

Related U.S. Application Data

(60) Provisional application No. 60/845,721, filed on Sep. 18, 2006.

(51) Int. Cl.
*B29D 11/00* (2006.01)

(52) U.S. Cl. ......... 264/2.5; 264/1.1; 264/1.32; 425/552; 425/808

(58) Field of Classification Search ............ 264/1.1, 264/1.32, 2.5; 425/552, 808
See application file for complete search history.

(56) References Cited

U.S. PATENT DOCUMENTS

| | | | |
|---|---|---|---|
| 4,208,364 A | 6/1980 | Shepherd | |
| 4,565,348 A | 1/1986 | Larsen | |
| 4,639,386 A | 1/1987 | Akao | |
| 5,087,015 A | 2/1992 | Galley | |
| 5,782,460 A | 7/1998 | Kretzschmar et al. | |
| 5,843,346 A | 12/1998 | Morrill | |
| 5,909,252 A | 6/1999 | Ueda et al. | |
| 5,991,394 A | 11/1999 | Dezonno et al. | |
| 6,393,206 B1 | 5/2002 | Yagi et al. | |
| 6,405,993 B1 | 6/2002 | Morris | |
| 6,453,120 B1 | 9/2002 | Takahashi et al. | |
| 6,564,006 B1 | 5/2003 | Mori et al. | |
| 6,567,607 B2 | 5/2003 | Ando et al. | |
| 6,821,108 B2 | 11/2004 | Hagmann et al. | |
| 2002/0198326 A1 | 12/2002 | Aoyama et al. | |

(Continued)

FOREIGN PATENT DOCUMENTS

EP     0924704 A    6/1999

(Continued)

OTHER PUBLICATIONS

Total Petrochemicals USA, Inc; Data sheet of PP 3620WZ, retrieved on Jun. 22, 2009.*

(Continued)

*Primary Examiner* — Matthew Daniels
*Assistant Examiner* — Jacob Thomas Minskey
(74) *Attorney, Agent, or Firm* — Klein, O'Neill & Singh, LLP (57) ABSTRACT

Contact lens molds and methods of producing soft cast-molded contact lens products are provided. The methods include placing a soft hydrophilic contact lens-forming composition in a cavity formed between a first mold member and a second mold member, subjecting the composition in the cavity to conditions effective to form a contact lens product from the composition, and repeating the placing and subjecting steps a plurality of times, thereby producing a plurality of soft contact lens products. At least the first mold members, and advantageously all of the first and second mold members, are injection-molded with a nucleated thermoplastic polyolefin resin having a melt flow rate in a range of 10 g/10 min to about 40 g/10 min.

13 Claims, 5 Drawing Sheets

U.S. PATENT DOCUMENTS

| | | | |
|---|---|---|---|
| 2004/0039077 A1 | 2/2004 | Baba et al. | |
| 2004/0044106 A1 | 3/2004 | Portnoy et al. | |
| 2004/0075039 A1 | 4/2004 | Dubey et al. | |
| 2004/0102572 A1 | 5/2004 | Kubo et al. | |
| 2004/0160089 A1 | 8/2004 | Gupta et al. | |
| 2006/0051454 A1* | 3/2006 | Ansell et al. | 425/808 |
| 2006/0055884 A1 | 3/2006 | Molinari et al. | |
| 2006/0202367 A1 | 9/2006 | Knutzen et al. | |
| 2007/0267765 A1* | 11/2007 | Ansell et al. | 264/1.36 |

FOREIGN PATENT DOCUMENTS

| | | |
|---|---|---|
| EP | 0924704 A2 | 6/1999 |
| EP | 1030307 A1 | 8/2000 |
| JP | 4-298875 A | 10/1992 |
| JP | 09-259574 | 10/1997 |
| JP | 11-144378 | 5/1999 |
| JP | 2001-043617 | 2/2000 |
| JP | 2000-173183 | 6/2000 |
| JP | 2000-195231 | 7/2000 |
| JP | 2000-306327 | 11/2000 |
| JP | 2005-23148 A | 1/2005 |
| WO | WO 98/42497 | 10/1998 |

OTHER PUBLICATIONS

PCT International Search Report completed Dec. 19, 2007 and mailed Feb. 26, 2008 from corresponding PCT Application No. PCT/US07/78659 filed Sep. 17, 2007 (2 pages).

PCT Written Opinion of the International Searching Authority completed Dec. 19, 2007 and mailed Feb. 26, 2008 from corresponding PCT Application No. PCT/US07/78659 filed Sep. 17, 2007 (8 pages).

Office Action issued in Korean Patent Application No. 1999-37307 on Mar. 2, 2006.

U.S. Appl. No. 11/290,599, filed Dec. 1, 2005, Seong-jin Moon, Samsung Electronics Co., Ltd.

U.S. Appl. No. 09/598,700, filed Jun. 21, 2000, Seong-jin Moon, Samsung Electronics Co., Ltd.

Continuation of U.S. Appl. No. 09/598,700, filed May 28, 2004, Seong-jin Moon, Samsung Electronics Co., Ltd.

Office Action mailed Mar. 15, 2010 from corresponding Japanese Application No. 2007-270671 (5 pages).

Office Action mailed Sep. 9, 2010 from corresponding Taiwanese Application No. 096134940 (5 pages).

English Translation of Office Action mailed Sep. 9, 2010 from corresponding Taiwanese Application No. 096134940 (3 pages).

English Translation of Office Action received Apr. 21, 2011 from corresponding Japanese Application No. 2007-270671 (2 pages).

* cited by examiner

POLYOLEFIN CONTACT LENS MOLDS AND USES THEREOF

CROSS-REFERENCE TO RELATED APPLICATION

This application claims the benefit of U.S. Provisional Application No. 60/845,721, filed on Sep. 18, 2006, the contents of which are expressly incorporated herein by reference.

BACKGROUND

This invention relates to the production of molded soft contact lenses. More particularly, the invention relates to polypropylene contact lens molds and methods of making soft contact lenses, such as hydrogel contact lenses, using such molds.

Morrill U.S. Pat. No. 5,843,346 discloses a method of cast molding rigid gas permeable (RGP) contact lenses employing mold sections made of a thermoplastic polyolefin resin, such as polypropylene resin, having a melt flow rate of at least about 21 g/10 min. This patent discloses that mold sections made of such high melt flow rate resins produce rigid contact lenses with a higher consistency of optical quality relative to mold sections injection-molded from other thermoplastic polyolefin resins, i.e., thermoplastic polyolefin resins having a melt flow rate of 20 g/10 min or lower.

Portnoy et al. U.S. Patent Publication No. 2004/0044106 refers to the above-noted Morrill patent and (RGP) contact lenses. This publication discloses the use of molds including nucleated, metallocene-catalyzed polypropylene with melt flow rates lower than 100 g/10 min, desirably lower than 21 g/10 min, and including a nucleating agent. Melt flow rates of the polypropylene polymers were measured according to ASTM D1238 at 230° C., with a 2.16 kg load. Portnoy et al. disclose that such molds are useful for precision applications, such as molds for (RGP) contact lenses. Portnoy et al. focuses on the details of making the nucleated, metallocene catalyzed polypropylene and does not disclose contact lenses other than rigid gas permeable (RPG) contact lenses. Moreover, Portnoy et al. does not disclose any particular benefits or advantages of contact lenses produced using nucleated, metallocene-catalyzed polypropylene molds.

Ansell U.S. Patent Publication No. 2006/0051454 discloses the use of molds made from Ziegler-Natta catalyst-based polyolefin resin having a melt flow rate of less than 21 g/10 min, as per ASTM D 1238, to produce soft contact lenses. The Ansell publication discloses that molds made of the Ziegler-Natta polyolefin resin molds with a melt flow rate less than 21 g/10 min have equivalent or better quality indications relative to molds created with metallocene catalyst-based polypropylene, and that lenses produced using a polyolefin mold material with a melt flow index of less than 21 g/10 min can include a diminished number of holes, chips, and tears in the manufactured lenses. The Ansell publication does not disclose or suggest the use of a nucleating agent.

There is a continuing need to provide contact lenses, for example, soft or hydrogel contact lenses, with good surface and optical properties in a consistent and cost effective manner.

SUMMARY

New lens molds and methods useful in producing soft contact lenses have been discovered. The present molds and methods provide contact lenses having consistent high optical quality, for example, producing lenses with fewer surface defects and/or with less severe surface defects and/or reduced optical distortion caused by surface defects. Further, the present molds and methods use reduced amounts of energy, shorten contact lens production cycle time and achieve reduced machinery wear and tear. Such advantageous results are relative to producing identical soft contact lenses from molds made of thermoplastic polyolefin, in particular polypropylene, resin having a melt flow rate of less than 10 g/10 min, for example 1.9 g/10 min. Moreover, it has been found that these benefits of producing soft contact lenses in accordance with the present invention can be obtained without requiring molds made of thermoplastic polyolefin resins having a melt flow rate of at least about 21 g/10 min, as in the above-noted Morrill patent for rigid gas permeable contact lenses, and without requiring molds made out of Ziegler-Natta catalyst-based polyolefin resin, as in the above-noted Ansell publication.

In one broad aspect of the invention, methods of producing soft contact lens products, for example, soft hydrophilic or hydrogel contact lens products, are provided, and comprise placing a soft lens-forming composition in a cavity formed between a first mold member and a second mold member, subjecting the soft lens-forming composition in the cavity to conditions effective to form a contact lens product from the lens-forming composition, and repeating the placing and subjecting steps a plurality of times, for example, at least about 100 times or at least about 1000 times or at least about 10,000 times, thereby producing a plurality of soft contact lens products. At least the first mold members, and advantageously all of the first and second mold members, comprise a nucleated thermoplastic polyolefin resin having a melt flow rate in a range of 10 g/10 min to about 40 g/10 min. The present methods produce a plurality of soft contact lens products having fewer surface defects and/or less severe surface defects and/or reduced optical distortion caused by surface defects relative to an identical plurality of soft contact lens products produced in identical molds in which the first mold members comprise a thermoplastic polyolefin resin having a melt flow rate of less than 10 g/10 min, for example, 1.9 g/10 min.

In another aspect, the present invention is directed to a method of producing soft hydrophilic cast-molded contact lenses having enhanced surface quality. Such method comprises: providing first and second mold members structured to be assembled together to form a lens-shaped cavity therebetween, each of the first and second mold members comprises a nucleated, thermoplastic polyolefin resin having a melt flow rate in a range of about 10 g/10 min to about 40 g/10 min; placing a soft hydrophilic contact lens-forming composition in the cavity; forming a soft hydrophilic contact lens product from the soft hydrophilic contact lens-forming composition in the cavity; removing the soft hydrophilic contact lens product from the first and second mold members; and repeating the above-noted providing, placing, forming and removing steps a plurality of times. The present method produces a plurality of soft hydrophilic contact lens products having enhanced surface quality relative to an identically produced plurality of soft contact lens products made using first and second mold members comprising thermoplastic olefin resin having a melt flow rate of 1.9 g/10 min.

In a further aspect of the invention, a method of producing soft hydrophilic contact lenses is provided which includes forming a plurality of soft hydrophilic contact lens products from a soft hydrophilic contact lens-forming composition in cavities formed by first and second mold members and removing the soft hydrophilic contact lens products from the first and second mold members. This method comprises using first and second molds comprising a nucleated thermoplastic polyolefin resin having a melt flow rate in a range of about 10 g/10 min to about 40 g/10 min, and producing a soft hydrophilic contact lens with enhanced surface quality.

In another aspect, methods are provided as recited in the present claims.

In another aspect, contact lens mold members, contact lens mold assemblies, and batches of contact lens mold assemblies are provided.

As an example, contact lens mold assemblies and batches thereof are provided, as recited in the present claims.

The soft contact lens surface quality benefits of the present invention are effectively demonstrated by considering a plurality of soft contact lens products made identically. For example, consideration of at least about 100 or at least about 1,000 or at least about 10,000 or a full commercial run or batch of such soft contact lens products demonstrate the enhanced surface quality achieved in accordance with the present invention, for example, relative to a plurality of soft lens products produced using different thermoplastic olefin resin molds, as set forth elsewhere herein.

All patents, patent publications and other publications identified herein are hereby incorporated in their entireties herein by reference.

These and other aspects and advantages of the present invention are apparent in the following detailed description and drawings in which like parts bear like reference numbers.

Any and all features described herein and combinations of such features are included within the scope of the present invention provided that the features of any such combination are not mutually inconsistent. In addition, any feature or combination of features may be specifically excluded from any embodiment of the present invention.

DETAILED DESCRIPTION

Figure 1:
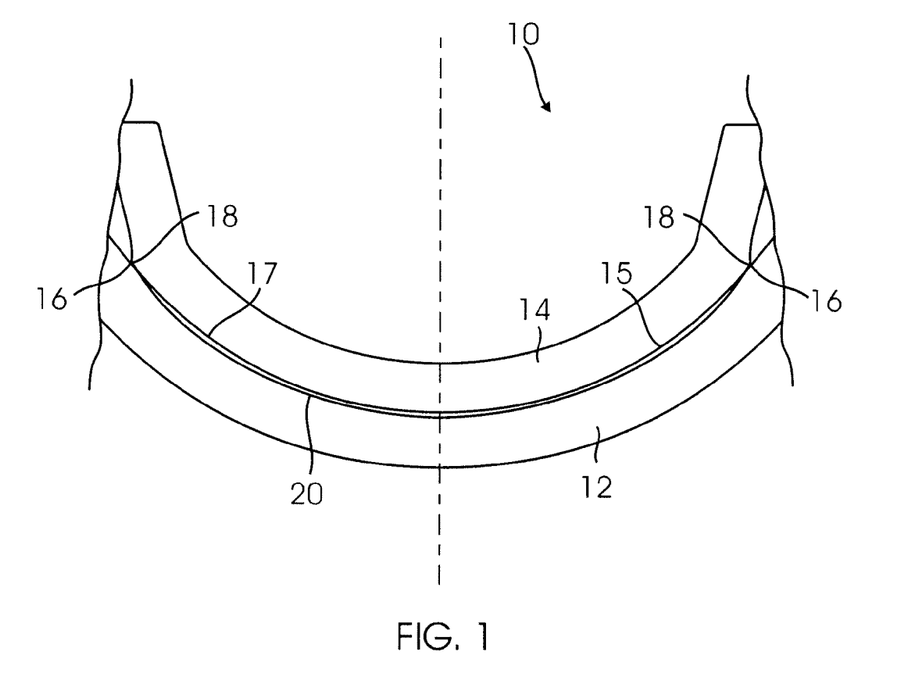
FIG. 1 is a cross-sectional view of a contact lens mold assembly useful in accordance with the present invention.

A representative contact lens mold assembly for use in the present methods is shown in FIG. 1.

Specifically, referring to FIG. 1, a contact lens mold assembly, shown generally at 10, includes a first or female mold member 12 coupled to a second or male mold member 14 to form a lens-shaped cavity 15 which has a circular periphery. In addition, the first and second mold members 12 and 14 can be structured to produce a contact lens having a rounded posterior lens edge surface. However, other embodiments of the mold members 12 and 14 may form non-rounded lens edge surfaces. As shown in FIG. 1, lens-shaped cavity 15 contains a polymerizable contact lens precursor composition 17, which is discussed in detail elsewhere herein. The first and second mold members 12 and 14 are made of thermoplastic polyolefin resin and are interference fitted together. In particular, first and second mold members 12 and 14 are press fitted together at first peripheral region 16 (of first mold member 12) and second peripheral region 18 (of second mold member 14). Thus, first and second peripheral regions 16 and 18 are structured to be in direct, securing contact when the mold 10 is assembled as shown in FIG. 1. The first and second mold members 12 and 14 can be securely joined or coupled together simply by moving one or both of the mold members toward each other until the peripheral regions 16 and 18 come into direct, securing contact. When it is desired to separate the first and second mold members 12 and 14, the mold members can be pulled apart or a tool can be used to overcome the direct, securing contact at the peripheral regions 16 and 18, preferably without causing substantial damage to at least one of the first and second mold members and to the ophthalmic lens product formed in the lens-shaped cavity.

The contact lens precursor composition 17 within the lens-shaped cavity often includes one or more monomers, macromers, polymers, or other reactive agents, and combinations thereof, which are polymerized, such as by exposure to UV light and/or heat, to form a contact lens product. Other processing steps may include, without limitation, disassembling the mold assembly or demolding the mold assembly, removing the contact lens product from the first mold member or second mold member or delensing the contact lens product from a mold member, extracting extractable materials from the contact lens product, for example, extracting extractable materials from a silicone hydrogel contact lens product, hydrating the extracted contact lens product, inspecting the contact lens, packaging the contact lens, and sterilizing the contact lens. In certain lenses, a separate extraction step may not be necessary. The resulting contact lens is a cast-molded contact lens.

In accordance with one aspect of the present invention, at least one of the first and second mold members comprises a nucleated thermoplastic polyolefin resin having a melt flow rate in a range of 10 g/10 min to about 40 g/10 min. As used herein, the term "g/10 min" refers to grams per 10 minutes. As used herein, the term "melt flow rate" denotes the industry known standard ASTM D 1238-86. This parameter is usually available from suppliers of commercial resins. Such mold member or members may be conventionally produced, for example, by injection molding processing. According to preferred embodiments, both mold members are injection molded from one or more of such resins.

The mold sections may be injection molded from the presently useful thermoplastic polyolefin resins by methods which are otherwise known in the art. The tools for the injection molding are typically made from brass, stainless steel or nickel or some combination thereof. A preferred material for use with this invention is nickel-plated brass.

Any suitable thermoplastic polyolefin resin or mixture of such resins may be employed in the presently useful mold assemblies provided that such resin or resins yield mold assemblies which function in accordance with the present invention, for example, to provide high quality contact lenses, as set forth herein. As noted elsewhere herein, the presently useful thermoplastic polyolefin resin or resins used in the first and/or second mold members have a melt flow rate in a range of 10 g/10 min to about 40 g/10 min. Examples of such thermoplastic polyolefin resins include, without limitation, thermoplastic polyethylene resins, thermoplastic polypropylene resins, thermoplastic polystyrene resins, and the like and mixtures thereof. The presently useful thermoplastic polyolefin resins can be made in any suitable manner, for example, using conventional and well known processing. Therefore, a detailed description of such processing is not presented here. In one embodiment, the thermoplastic polyolefin resins useful in the present invention are other than Ziegler-Natta catalyst-based polyolefin resins. Particularly useful thermoplastic polyolefin resins are selected from thermoplastic polypropylene resins and mixtures thereof.

The presently useful mold members which include such thermoplastic polyolefin resins often contain a major amount, that is at least about 50% by weight, for example, at least about 70% or at least about 90% or more, by weight, of such resins.

The thermoplastic polyolefin resin or resins used in the mold assemblies in accordance with the present invention advantageously contain a nucleating agent, an agent specifically or primarily utilized to increase the rate of crystallization of the polyolefin component as it cools from the melt as compared to the same or identical polyolefin component without the nucleating agent. Many nucleating agents are suitable for inclusion with the thermoplastic polyolefin resin formulations useful in the present invention. Suitable nucleating agents are disclosed by, for example, H. N. Beck in Heterogeneous Nucleating Agents for Polypropylene Crystallization, 11 J. APPLIED POLY. SCI. 673-685 (1967) and in Heterogeneous Nucleation Studies on Polypropylene, 21 J. POLY. SCI.: POLY. LETTERS 347-351 (1983). Examples of suitable nucleating agents include, without limitation, sodium benzoate, sodium sulfate, sodium 2,2'-methylenebis (4,6-di-tert-butylphenyl) phosphate, aluminum 2,2'-methylenebis(4,6-di-tert-butylphenyl) phosphate, dibenzylidene sorbitol, di(p-tolylidene) sorbitol, di(p-ethylbenzylidene) sorbitol, bis(3,4-dimethylbenzylidene) sorbitol, and N',N'-dicyclohexyl-2,6-naphthalenedicarboxamide, salts of disproportionated rosin esters, and the like and mixtures thereof. A very useful nucleating agent is sodium sulfate.

Without wishing to limit the present invention to any particular theory of operation, it is believed that the presence of an effective amount of nucleating agent in the thermoplastic polyolefin resin acts to reduce the time required for crystallization of the polyolefin resin and/or to produce smaller crystals of the polyolefin resin relative to an identical thermoplastic polyolefin resin without the nucleating agent. Reducing polyolefin crystallization time is believed to allow for better and more precise control of polyolefin resin crystallization. Producing smaller polyolefin resin crystals is believed to allow the polyolefin resin (crystallized) to more closely conform to the desired shape of the mold member or members, in particular to the desired shape of the surface or surfaces of the mold member or members which are shaped to produce the anterior and/or posterior surfaces of the contact lens product. For example, the presence of a nucleating agent may at least assist in reducing shrinkage time of the mold member or members, for example, during processing to produce contact lens products relative to such shrinkage time in identical mold member/members in the absence of the nucleating agent. Ultimately, such reduced crystallization times and/or smaller crystals and/or reduced mold member shrinkage time are believed to at least facilitate producing mold members with surfaces which result in contact lens products and hydrated contact lenses with reduced or less severe surface defects and/or reduced or less severe optical distortion caused by surface defects, which benefits of the present invention are described elsewhere herein.

The nucleating agent may be included with the thermoplastic polyolefin resin at the resin manufacturing facility or may be added to the resin after resin manufacture and prior to producing the mold member or members. The amount of nucleating agent employed may vary based on, for example, the specific nucleating agent employed, the specific thermoplastic polyolefin resin employed, the specific complete formulation of the mold members employed and the like factors. The nucleating agent may be present in an amount in a range from about 0.01% to about 2% (wt/wt). For example, in certain embodiments, the mold member or mold members comprise from about 0.1% to about 1.5% (wt/wt) of a nucleating agent. More specifically, embodiments of the present mold member or mold members may comprise about 0.2%, about 0.4%, about 0.5%, about 0.6%, about 0.8%, or about 1.0% (wt/wt) of a nucleating agent.

Other additives may be included in the thermoplastic polyolefin formulations used to produce the mold members. The thermoplastic polyolefin formulation may include an antioxidant to deter oxidative degradation of the polymer and/or an acid scavenger to neutralize catalyst residues which may be present in the resin. Examples of useful antioxidants include, without limitation, hindered phenolic antioxidants, hindered amine light stabilizers, and the like and mixtures thereof. Examples of useful acid scavengers include, without limitation, metal salts of weak fatty acids such as sodium, calcium, or zinc stearate and weakly basic minerals such as hydrotalcite, and the like and mixtures thereof.

In one embodiment, a stabilizer component may be added to the thermoplastic polyolefin resin to stabilize the resin to oxidative degradation during high temperature processes or during storage at elevated temperatures. Examples of the organic phosphorous acid esters (phosphites) such as trinonylphenol phosphite and tris (2,4-di-t-butylphenyl) phosphite, distearyl, hydroxylamine, 5,7-di-t-butyl-3-(3,4- dimethylphenyl)-3H-benzofuranone, distearyl thiodipropionate, other fatty esters of thiodipropionic acid, and the like and mixtures thereof.

Many other types of additives can be included in the thermoplastic polyolefin resin formulations useful in this invention. Such other additives include without limitation, lubricants, antistatic agents, slip agents, anti-blocking agents, colorants, metal deactivators, mold release agents, fillers and reinforcements, fluorescent whitening agents, biostabilizers, and the like and mixtures thereof.

Representative commercial polypropylene materials having the defined melt flow rate include the following wherein melt flow rate (MFR) is indicated in g/10 min: the polypropylene resins available under the trade name or designation Total 3622 (Total Petrochemicals USA, Inc., MFR 12; Achieve 1654E1 (Exxon Mobil Chemical Co.) MFR 16; P4C5N-046, P4C6N-041 (Huntsman Polymers Corp.) MFR 20 and 35, respectively; Pro-Fax PDC 1288 (Basell Polyolefins) MFR 12; 10-7234 (BP Amoco Chemical Company) MFR 12.6; Marlex HLN-200 (Phillips Sumika Polypropylene Company) MFR 20; and FT-120-WV, ZS-751 and ZP-761 (Sunoco Chemicals) MFR 12.0, 22.0, and 12.0 respectively. Another thermoplastic polyolefin resin suitable for use in a polyolefin copolymer (one of the olefins being propylene) available under the designation PLTD 1870 (Exxon Mobil Chemical Company) MFR 16.

A number of the above-noted polypropylene products are nucleated, that is such products include a nucleation agent which is effective in at least assisting in controlling polymer crystallinity.

In one embodiment, once the first and second mold members are produced, such as injection molded, or otherwise provided, the present methods comprise placing a soft lens-forming composition in a cavity formed between the first and second mold members or placing a soft lens-forming composition on a portion of one mold member and placing the other mold member in contact therewith to form a lens shaped cavity containing the composition; and subjecting the soft lens-forming composition in the cavity to conditions effective to form a soft contact lens product from the soft lens-forming composition. The placing and subjecting steps are repeated a plurality of times for a plurality of contact lens molds, thereby producing a plurality of soft contact lens products. Such plurality of soft contact lens products have surprisingly been found to have fewer surface defects and/or less severe surface defects and/or reduced optical distortion caused by surface defects relative to an identical plurality of soft contact lens products produced in identical molds in which the first mold members comprise a thermoplastic polyolefin resin having a melt flow rate of less than 10 g/10 min., for example, a thermoplastic polyolefin resin having a melt flow rate of 1.9 g/10 min.

In other words, the present invention provides for fewer surface defects and/or less severe surface defects and/or reduced optical distortion caused by surface defects in multiple lenses made in accordance with the present invention. For example, the placing and subjecting steps may advantageously be repeated at least about 100 times or at least about 1,000 times or at least about 10,000 times. For example, a polymerizable lens precursor composition can be dispensed or placed in the cavities of a plurality of the contact lens molds disclosed herein, such as at least about 100 lens molds or at least about 1,000 lens molds or at least about 10,000 lens molds. The placement steps can be practiced in parallel or serially or both. For example, for a batch of 100 contact lenses, the methods can comprise four steps of placing the lens precursor composition in the cavities of 25 molds, ten steps of placing the lens precursor composition in the cavities of 10 molds, or twenty-five steps of placing the lens precursor composition in the cavities of 4 molds.

In one embodiment, both the first and second mold members comprise a nucleated thermoplastic polyolefin resin having a melt flow rate in a range of 10 g/10 min to about 40 g/10 min, and the first and second mold members of the identical molds comprise the thermoplastic polyolefin resin having a melt flow rate of less than 10 g/10 min, for example, 1.9 g/10 min or less than 1.9 g/10 min.

The present invention is particularly advantageous when the plurality of soft contact lens products are hydrogel contact lens products or silicone hydrogel contact lens products. Some examples of the contact lens products are hydroxyethylmethacrylate (HEMA)-based contact lenses.

In one embodiment, with the first and second mold members assembled together, a silicone hydrogel precursor composition or a non-silicon-containing hydrogel precursor composition is located in the lens-shaped cavity formed between the first and second mold members.

As used herein, the term "hydrogel" refers to a network or matrix of polymer chains, some or all of which may be water-soluble, and which may contain high percentages of water. Hydrogels refer to polymeric materials, including contact lenses, that are water swellable or water swelled. Thus, a hydrogel may be unhydrated and be water swellable, or a hydrogel may be partially hydrated and swollen with water, or a hydrogel may be fully hydrated and swollen with water. The term "silicone hydrogel" or "silicone hydrogel material" refers to a hydrogel that includes a silicon component or a silicone component. For example, a silicone hydrogel includes one or more silicon-containing polymers. A silicone hydrogel contact lens is a contact lens, including a vision correcting contact lens, comprising a silicone hydrogel material.

A silicone-containing component is a component that contains at least one [—Si—O—Si] group, in a monomer, macromer or pre-polymer. The Si and attached O may be present in the silicone-containing component in an amount greater than 20 weight percent, for example greater than 30 weight percent of the total molecular weight of the silicone-containing component. Useful silicone-containing components comprise polymerizable functional groups such as acrylate, methacrylate, acrylamide, methacrylamide, N-vinyl lactam, N-vinylamide, and styryl functional groups. Examples of some silicone-containing components which are useful in the present lenses may be found in U.S. Pat. Nos. 3,808,178; 4,120,570; 4,136,250; 4,153,641; 4,740,533; 5,034,461 and 5,070,215, and European Patent No. EP080539. Examples of silicone hydrogel contact lens materials have US Adopted Names of lotrafilcon A, lotrafilcon B, senofilcon A, galyfilcon A, balafilcon A, and comfilcon A.

Further examples of suitable silicone-containing monomers are polysiloxanylalkyl(meth)acrylic monomers including, without limitation, methacryloxypropyl tris(trimethylsiloxy) silane, pentamethyldisiloxanyl methyhmethacrylate, and methyldi(trimethylsiloxy)methacryloxymethyl silane.

One useful class of silicone-containing components is a poly(organosiloxane) prepolymer such as α,ω-bismethacryloxy-propyl polydimethylsiloxane. Another example is MPDMS (monomethacryloxypropyl terminated mono-n-butyl terminated polydimethylsiloxane). Another useful class of silicone containing components includes silicone-containing vinyl carbonate or vinyl carbamate monomers including, without limitation, 1,3-bis[4-(vinyloxycarbonyloxy)but-1-yl]tetramethylisiloxane 3-(vinyloxycarbonylthio) propyl-[tris(trimethylsiloxysilane]; 3-[tris(trimethylsiloxy)silyl] propyl allyl carbamate; 3-[tris(trimethylsiloxy)wilyl] propyl vinyl carbamate; trimethylsilylethyl vinyl carbonate; and trimethylsilylmethyl vinyl carbonate.

In addition to the silicon-containing component, the present lenses, lens products, and compositions may include one or more hydrophilic components. Hydrophilic components include those which are capable of providing at least about 20%, for example, at least about 25% water content to the resulting lens when combined with the remaining reactive components. Suitable hydrophilic components may be present in amounts between about 10 to about 60 weight % based upon the weight of all reactive components. About 15 to about 50 weight %, for example, between about 20 to about 40 weight %. Hydrophilic monomers that may be used to make the polymers for the present lenses have at least one polymerizable double bond and at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. Such hydrophilic monomers may themselves be used as crosslinking agents. "Acrylic-type" or "acrylic-containing" monomers are those monomers containing the acrylic group (CR'H=CRCOX) wherein R is H or $CH_3$, R' is H, alkyl or carbonyl, and X is O or N, which are also known to polymerize readily, such as N,N-dimethylacrylamide (DMA), 2-hydroxyethyl acrylate, glycerol methacrylate, 2-hydroxyethyl methacrylamide, polyethyleneglycol monomethacrylate, methacrylic acid, acrylic acid and mixtures thereof.

Hydrophilic vinyl-containing monomers which may be incorporated into the materials of the present lenses may include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester. In one embodiment, the hydrophilic vinyl-containing monomer is NVP.

Other hydrophilic monomers that can be employed in the present lenses include polyoxyethylene polyols having one or more of the terminal hydroxyl groups replaced with a functional group containing a polymerizable double bond. Examples include polyethylene glycol with one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Additional examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art. More preferred hydrophilic monomers which may be incorporated into the polymer of the present invention include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), and polyethyleneglycol monomethacrylate. In certain embodiments, hydrophilic monomers including DMA, NVP and mixtures thereof are employed.

Additional examples of materials used to make silicone hydrogel contact lenses include those materials disclosed in U.S. Pat. No. 6,867,245.

The non-silicon-containing hydrogel precursor compositions comprise monomers or monomer mixtures which are polymerized to form non-silicon-containing soft or hydrogel contact lens products in the mold assembly comprised of the two mold members or halves include, without limitation, 2-hydroxyethylmethacrylate ("HEMA"), and HEMA and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethylene/glycol methacrylate, glycidyl methacrylate, diacetone acrylamide, vinyl acetate, acrylamide, hydroxytrimethylene acrylate, methoxyethyl methacrylate, acrylic acid, methacrylic acid, glycerol methacrylate, dimethylamino ethyl acrylate and the like.

The non-silicon-containing precursor compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical crosslinking agents usually, but not necessarily, have at least two ethylenically unsaturated double bonds.

The non-silicon-containing precursor compositions generally also include a catalyst, usually from about 0.05 to 1% (w/w) of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by visible light, ultraviolet light, electron beam or a radioactive source may also be employed to catalyze the polymerization reaction, optionally with the addition of a polymerization initiator. Representative initiators include camphorquinone, ethyl-4-(N,N-dimethyl-amino)benzoate, and 4-(2-hydroxyethoxy)phenyl-2-hydroxyl-2-propyl ketone.

Polymerization of the monomer or monomer mixture in the mold assembly is preferably carried out by exposing the composition to polymerization initiating conditions. The preferred technique is to include in the composition, initiators which work upon exposure to thermal radiation; and exposing the composition to thermal radiation of an intensity and duration effective to initiate polymerization and to allow the polymerization of the composition to proceed to form a polymerized contact lens product.

After polymerization of the lens precursor composition, the mold assembly can be demolded, the polymerized contact lens product can be delensed from one of the mold members, either the female or male mold member, the delensed contact lens product can then be inspected and packaged in a packaging solution, and sterilized. In certain embodiments, such as silicone containing hydrogel contact lenses, the delensed contact lens product can be extracted and hydrated prior to packaging the lenses in a packaging solution.

With the present molds and methods, substantial improvements in the percentage of commercially acceptable contact lenses can be obtained. For example, with the present molds and methods, a greater percentage of a batch of contact lenses satisfies requirements for the commercial production of contact lenses. Examples of such requirements include lens diameters, base curves, thicknesses, surface smoothness, overall shape, and the like. Thus, the amount of lenses that must be discarded due to manufacturing variability and/or defects can be greatly reduced. The present molds and methods can result in hydrated soft hydrogel contact lenses that are produced with a commercial acceptability rate of at least 70%, at least 80%, or at least 90%. In other words, with the present molds and methods, less than 30%, less than 20%, or less than 10% of the pre-hydrated or hydrated contact lenses must be discarded due to manufacturing variability or defects. For example, conventional hydrogel contact lenses can be produced with a commercial acceptability rate of at least 90%, or at least 95%. For example, at least 90 of 100 or at least 95 of 100 lenses are acceptable and free of surface defects. In addition, silicone hydrogel contact lenses obtained from the present molds can be produced with a commercial acceptability rate of at least 80%, for example, at least 80 of 100 silicone hydrogel contact lenses are acceptable and free of surface defects. The commercial acceptability of the contact lenses and/or polymerized contact lens products can be determined using conventional techniques and methods. For example, the lenses can be inspected one or more times, either visually or automatically using one or more computerized machines, to ensure that the manufactured lenses are within predetermined manufacturing tolerances and are free of defects. The commercial acceptability rate can be determined by calculating the number of contact lenses from a batch or plurality of contact lenses that must be discarded before distribution to consumers.

Figure 2:
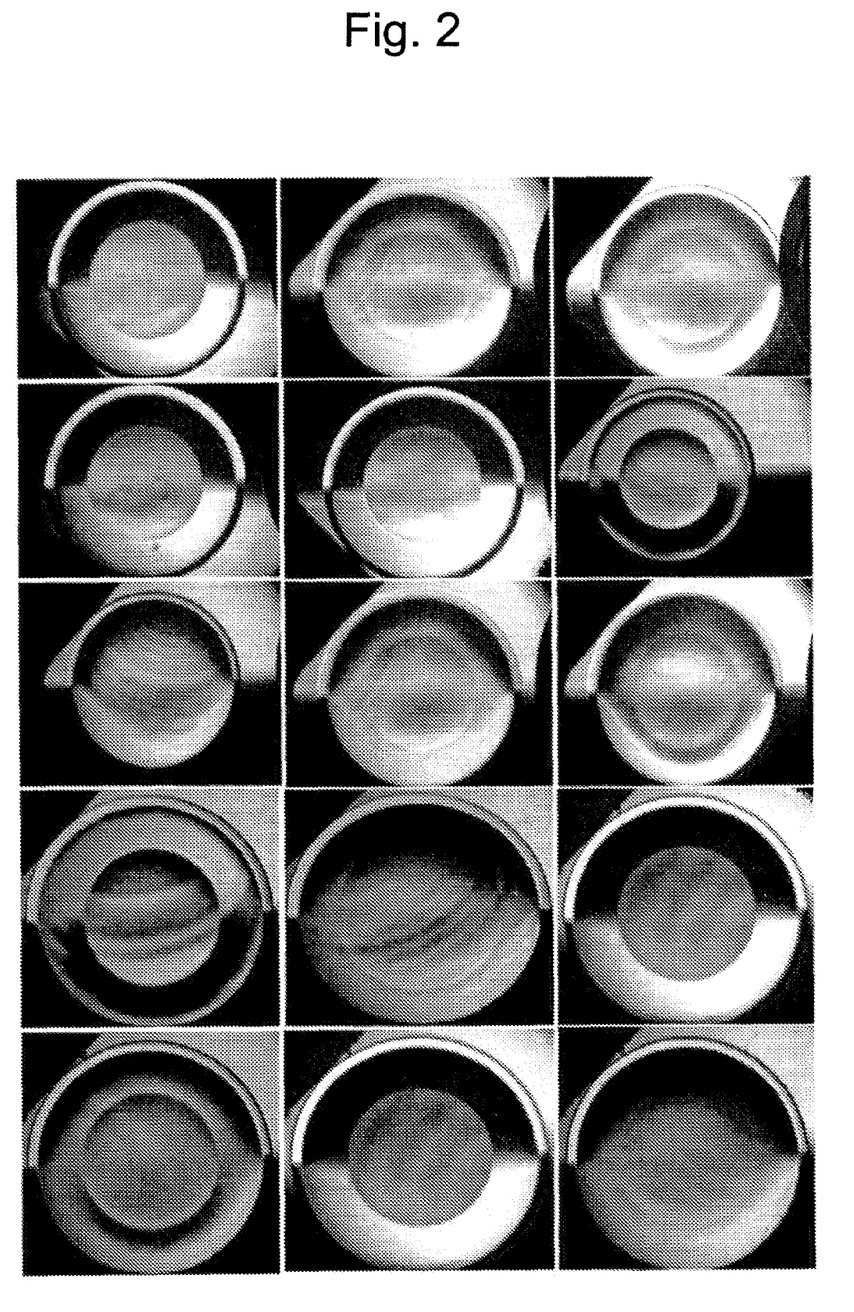
FIG. 2 shows a series of soft contact lenses produced using polypropylene contact lens molds having a melt flow rate of 1.9 g/10 min.

As one example, the number of contact lenses obtained from the present molds with visually smooth surfaces is greater than the number of contact lenses obtained from molds injection molded with a thermoplastic polyolefin resin having a melt flow rate of 1.9 g/10 min. The surface quality of the present lenses is visually noticeable using a magnifier at a magnification of at least 28×. One example of a device that can be used to view the lenses for surface defects is described in U.S. Pat. No. 4,784,485. A significant number of lenses obtained from contact lens molds injection-molded with a thermoplastic polyolefin resin having a melt flow rate of 1.9 g/10 min have a surface that is not acceptable or is defective. These defective surfaces have a visible texture that appears similar to a wavy texture or an orange peel or mottled texture on a scale from about 0.2 µm to about 2 µm scale. In other words, instead of a smooth surface, the surface of such defective lenses is characterized by the presence of hills or peaks and valleys. For example, a contact lens with a wavy texture can have a surface that has visibly noticeable undulations in the appearance of waves. The undulations may have a sinusoidal shape when viewed in cross-section, and the period of undulations or waves can be regular or irregular. Orange peel texture observed on these defective lenses can be described as appearing like the surface of an orange peel or otherwise mottled characterized by regions of peaks and regions of valleys. That is, the surface of the lens has a visibly irregular surface characterized by randomly spaced hills or peaks and valleys. Examples of such defective lenses are shown in FIG. 2.

The surface defects of contact lenses are directly transferred from the plastic molds, which are injection-molded using a thermoplastic polyolefin having a melt flow rate of less than 10 g/10 min, such as 1.9 g/10 min. Due to the low melt flow rate, there are tremendous pressure loss and temperature drop for the molten flow fronts during the filling phase of the injection molding process. The unpleasant molding conditions can cause the surface defects on the plastic molds, which are used to cast contact lenses. When the contact lenses are made with defective molds, they will have the same or similar surface defects. Particularly, when the contact lenses swell to become larger during extraction and hydration processes, those surface defects become larger as well. The wavy and orange peel surface textures can have adverse effects on lens optical and vision quality. These adverse effects should be minimized or eliminated during the commercial production of contact lenses.

While the presence of waves or orange peel surface texture is visibly apparent when the contact lens is viewed at 28× magnification with a lens viewing instrument, such as a knife edge optical system, and the like, these surface defects can be further characterized when the contact lens is viewed in cross-section, or when the contact lens is analyzed using a measurement device such as an interferometer and the like. One example of an interferometer useful in quantifying the surface defects of contact lenses obtained from the present molds is the µPhase® FST 10 (Fisba Optik, Rochester, N.Y.).

A cross-section of the lens can provide an indication of the contact lens thickness from the contact lens peripheral edge to the optical center of the lens, and possibly to the opposing peripheral edge. In a contact lens having smooth surfaces, the thickness is controlled and corresponds to the distance between the surface of the first mold section and the surface of the second mold section that define the contact lens shaped cavity of the contact lens mold assembly. The surface of such lenses can be described mathematically, such as by using Zernike terms and wave-front analysis to fit the wavefront error of a lens for a given field point. However, in a contact lens with a surface defect, such as wave texture or orange peel texture, the thickness varies and the thickness profile (e.g., a map of the thickness from the lens edge towards the optic center of the lens or a diametrically opposing edge) is irregular and is characterized by peaks and valleys. The distance between a peak and adjacent valley on the thickness profile of a lens with a surface defect, as described herein, can be on the order of about 0.2% of the target thickness of the lens as determined by the distance between the two opposing surfaces defining the lens-shaped cavity of the contact lens mold assembly at the same distance from the lens edge periphery or perimeter of the lens shaped cavity. Or, the distance between a peak and adjacent valley on the thickness profile of a lens with a surface defect, as described herein, can be on the order of about 2.0% of the target thickness of the lens as determined by the distance between the two opposing surfaces defining the lens-shaped cavity of the contact lens mold assembly at the same distance from the lens edge periphery or perimeter of the lens shaped cavity.

Alternatively, the surface defects can be quantified by using a measurement device such as an interferometer. Interferometers are publicly available from companies, such as Fisba Optik. Publicly available computer software can be used to analyze the data and determine peak-to-valley distance for lens surfaces. The peak-to-valley distance or value represents the distance between a high point and an adjacent low point of a contact lens. The value is indicative of the magnitude of the surface defect where a value closer to 0 represents little or no defect and the magnitude of the defect or surface texture increases as the value increases. The distance can be measured as the perpendicular distance from the peak to the adjacent valley. More specifically, the system can utilize wave-front analysis to fit the propagated waveform reflected from a surface using a set of orthogonal Zernike terms, as understood by persons of ordinary skill in the art. A specific set or defined set of Zernike terms can be fit to the wave-front of the surface, and the symmetric or regular features of the surface can be filtered out using the Zernike terms. The residual resulting from the fitting will include the other irregular features of the surface.

The irregular features of the lenses with surface wave textures or orange peel textures cannot be adequately fitted with the Zernike terms. Thus, the residual wave-front fit can be used to quantify the waves and mottling of the surface, and characterize them by peak-to-valley distance, for example. For example, a wave-front surface can be fit with Zernike terms up to 10 orders. The magnitude of the waves or mottling is determined by removing all of the symmetric or regular terms of the surface deviations and examining the resulting peak-to-valley value.

Using an interferometer, as described herein, peak-to-valley distances of contact lenses with wavy or mottled surfaces were observed as small as 0.18 micrometers. For example, in a batch of contact lenses, undesirable surface wave texture had a peak-to-valley distance from 0.18 micrometers to 1.07 micrometers, where the 0.18 micrometers was the value for a lens surface with a relatively small amount of waving, and the 1.07 micrometer value was the value for a lens surface with a relatively large amount of waving. In another batch of lenses, the peak-to-valley distance for a lens with a mottled lens surface was from 0.18 micrometers to 0.35 micrometers.

FIG. 2, as described herein, provides images of a batch of contact lenses obtained from contact lens molds injection molded using a polypropylene resin having a melt flow rate of 1.9 g/10 min. These lenses are characterized by mottled or wavy lens surfaces, or both.

Figure 3:
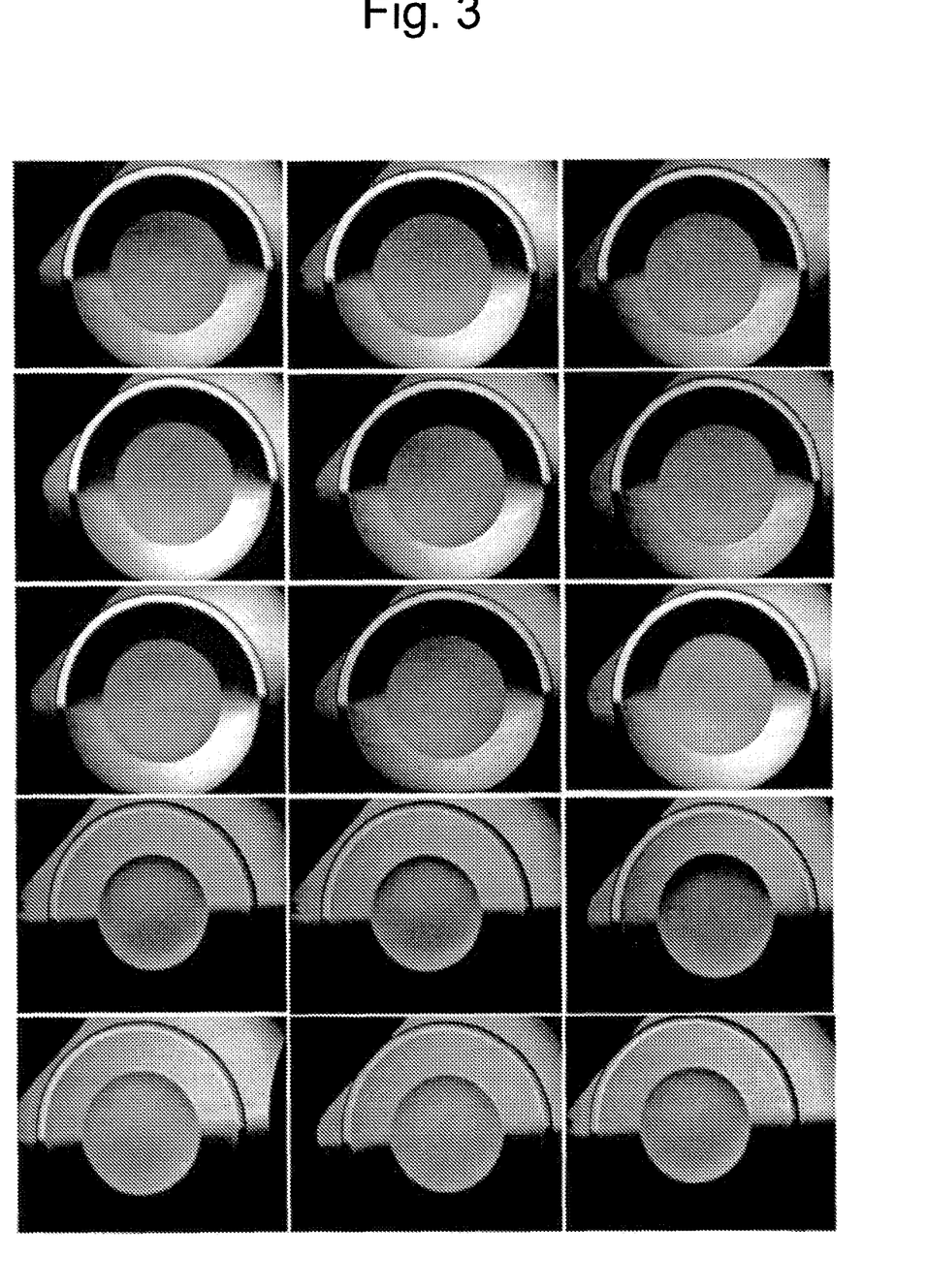
FIG. 3 shows a series of soft contact lenses produced in accordance with one embodiment of the present invention.
Figure 4:
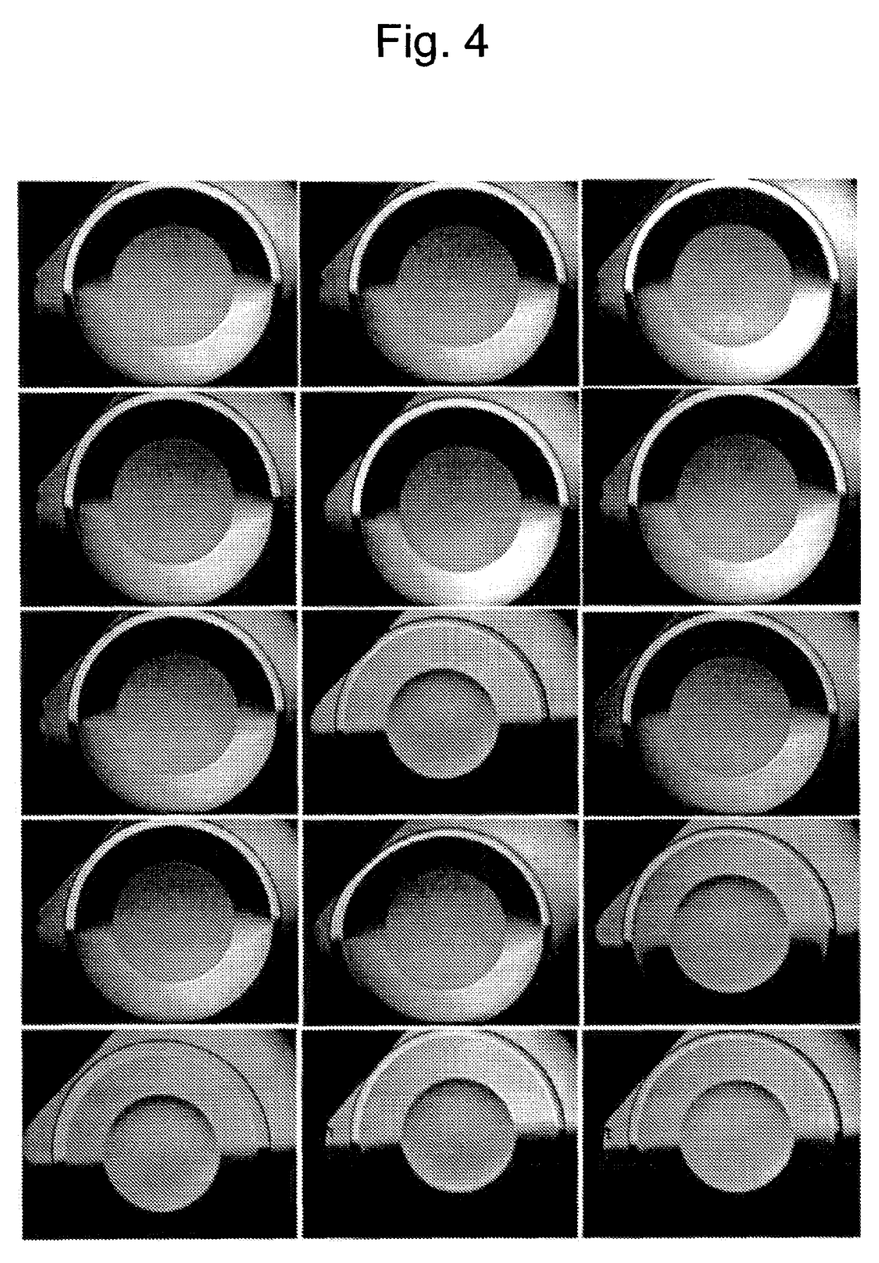
FIG. 4 shows a series of soft contact lenses produced in accordance with another embodiment of the present invention.

FIGS. 3 and 4, as described herein, provide images of batches of contact lenses obtained from contact lens molds injection molded using a polypropylene resin having a melt flow rate from about 10 g/10 min to about 40 g/10 min. These lenses are characterized as having enhanced surface qualities, that is being free of surface waves or mottling having a peak-to-valley value of at least 0.18 micrometers, such as determined using μPhase® FST 10 interferometer, or similar device.

Figure 5A:
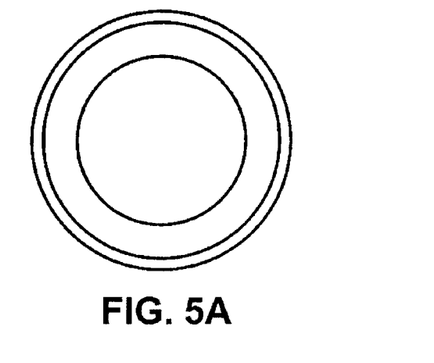
FIG. 5A is an illustration of a plan view image of a contact lens obtained using a knife edge optical system, the contact lens being obtained from a contact lens mold formed of nucleated thermoplastic polyolefin resin having a melt flow rate in a range of about 10 g/10 min to about 40 g/10 min.

FIG. 5A is a line illustration of an example of a contact lens, similar to a contact lens shown in FIG. 3 or FIG. 4, that has an enhanced surface quality, that is, a surface that is free of surface waves or mottling having a peak-to-valley value of at least 0.18 micrometers. In other words, if the lens has some surface waving or mottling and the peak-to-valley value is less than 0.18 micrometers, it is not visually apparent at 28× magnification using a knife edge optical system, as determined using an interferometer and wavefront analysis, then the lens is deemed to have enhanced surface quality as a result of being manufactured by the lens mold provided in accordance with aspects of the present invention. Different zones of the contact lens can be visually identified, such as the central optical zone, an immediately adjacent peripheral zone circumscribing the central optical zone, and an immediately adjacent edge zone circumscribing the peripheral zone.

Figure 5B:
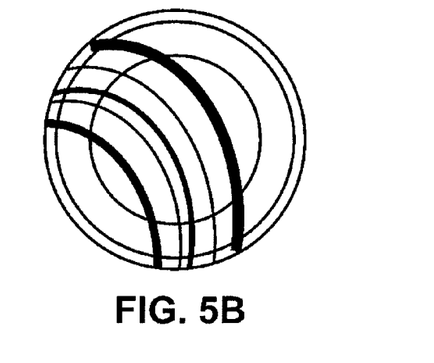
FIG. 5B is an illustration of a plan view image of a contact lens obtained using a knife edge optical system, the contact lens being obtained from a contact lens mold formed of a polyolefin resin having a melt flow rate of 1.9 g/10 min.

FIG. 5B is a line illustration of an example of a contact lens, similar to a contact lens shown in FIG. 2. In this example, the contact lens has a wavy surface, represented by the curved arcs which are reflections or shadows observed with the knife edge optical system. The peak-to-valley value for the wavy lens surface is at least 0.18 micrometers. The waves, represented by the reflections or shadows, are undesirably present in the central optical zone.

Figure 6A:
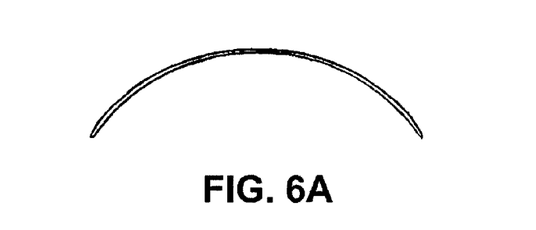
FIG. 6A is an illustration of a section of a contact lens obtained from a contact lens mold formed of nucleated thermoplastic polyolefin resin having a melt flow rate in a range of about 10 g/10 min to about 40 g/10 min.

FIG. 6A is a line illustration of a cross-section of an example of a contact lens obtained from the present contact lens mold assemblies. As illustrated, the contact lens has relatively smooth surfaces that can be described mathematically. As an example, the surfaces do not have visibly identifiable waves or peaks and valleys, and if they do have any peaks and valleys, the peak-to-valley distance is less than 0.18 micrometers. It will be understood that this cross-section of a contact lens is a simplified illustration of a contact lens, and that actual cross-section images may show different thickness configurations and may show visible junctions between different zones of the contact lens.

Figure 6B:
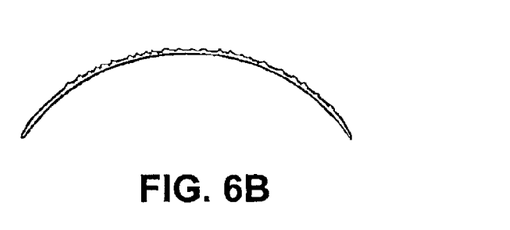
FIG. 6B is an illustration of a section of a contact lens obtained from a contact lens mold formed of a polyolefin resin having a melt flow rate of 1.9 g/10 min.

FIG. 6B is a line illustration of a cross-section of an example of a contact lens obtained from a contact lens mold assembly comprising two mold members formed from an injection molded polypropylene resin having a melt flow rate of 1.9 g/10 min. The anterior surface is illustrated as having an irregular surface characterized by peaks and valleys. The peaks and valley distances of such a lens surface is at least 0.18 micrometers.

Figure 7A:
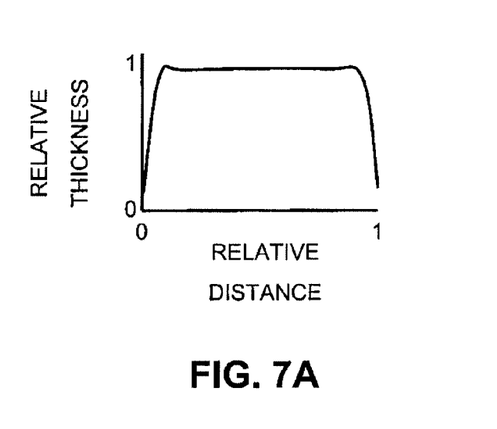
FIG. 7A is an illustrative graph illustrating an example of a thickness profile of a contact lens obtained from a contact lens mold formed of nucleated thermoplastic polyolefin resin having a melt flow rate in a range of about 10 g/10 min to about 40 g/10 min. The Y-axis represents the relative thickness where 1 is indicative of the maximum thickness of the contact lens, and the X-axis represents the relative distance across the contact lens section where 0 is indicative of one edge of the contact lens section and 1 is indicative of the diametrically opposed edge of the contact lens section. The optical center of the contact lens is located at the mid-point between 0 and 1.

FIG. 7A is an example of a thickness profile for a contact lens obtained from the present contact lens mold assemblies. The thickness increases from one lens edge toward a radial inward point, which can be near the outer border of the optic zone, and then decreases slightly in the optic zone, and increase and decrease again as the thickness is measured to the diametrically opposed lens edge. Again, this graph is provided for illustrative purposes only and other graphs or thickness profiles may appear different due to actual lens designs, the meridians along which the cross-section is obtained and the like.

Figure 7B:
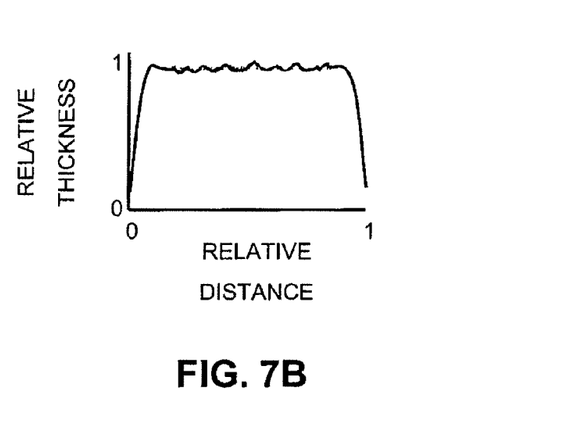
FIG. 7B is an illustrative graph illustrating an example of a thickness profile of a contact lens obtained from a contact lens mold formed of nucleated thermoplastic polyolefin resin having a melt flow rate 1.9 g/10 min. The Y-axis represents the relative thickness where 1 is indicative of the maximum thickness of the contact lens, and the X-axis represents the relative distance across the contact lens section where 0 is indicative of one edge of the contact lens section and 1 is indicative of the diametrically opposed edge of the contact lens section. The optical center of the contact lens is located at the mid-point between 0 and 1.

FIG. 7B is an example of a thickness profile for a contact lens obtained from a contact lens mold assembly comprising two mold members formed from an injection molded polypropylene resin having a melt flow rate of 1.9 g/10 min. Since one or both of the lens surfaces are characterized by visually identifiable peaks and valleys having a peak-to-valley distance of at least 0.18 micrometers, the thickness profile is irregular across the diameter of the lens section.

The present molds and methods can result in polymerized contact lens products, such as pre-extracted or pre-hydrated contact lens products that have enhanced commercial acceptability rates compared to polymerized contact lens products obtained from molds and methods using a thermoplastic polyolefin resin having a melt flow rate of less than 10 g/10 min, such as 1.9 g/10 min.

The present molds may be provided so that the first and second mold members are structured to be snap-fitted together or press fitted together or other forms of interference fitting together using one or more structural features on the first and/or second mold members to provide the interference fit. When certain silicone hydrogel contact lens formulations are placed in the present polypropylene molds, and are used to produce silicone hydrogel contact lenses, it is possible to obtain polypropylene molded silicone hydrogel contact lenses that comprise anterior and posterior surfaces with ophthalmically acceptable surface wettabilities, and which are free of surface treatments or polymeric wetting agent interpenetrating polymer networks that provide wettability to lens surfaces of silicone hydrogel contact lenses.

In view of the present disclosure, it can be appreciated that a specific embodiment of the present invention relates to a contact lens mold assembly comprising, consisting essentially of, or consisting entirely of, first and second polypropylene mold members having one or more of the following features: a melt flow rate greater than 10 g/10 min and less than about 40 g/10 min, as determined using the ASTM D1238 test method; a density of about 0.900 g/cm$^3$, as determined using the ASTM D1505 test method; a linear flow mold shrink from about 0.010 to about 0.020 in/in, as determined using the ASTM D955 test method; a tensile strength of about 5600 psi, as determined using the ASTM D638 test method; a tensile elongation at yield of about 8.0%, as determined using the ASTM D638 test method; a flexural modulus from about 200,000 psi to about 290,000 psi, as determined using the ASTM D790 test method; and a Rockwell hardness of about 110, as determined using the ASTM D785 test method. In certain embodiments, the present mold members comprise each of the foregoing features.

Another specific embodiment of the present invention relates to a contact lens mold assembly comprising first and second polypropylene mold members that comprise, consist essentially of, or consist entirely of a polypropylene resin currently available from Huntsman Corporation (Longview, Tex.) as product identification numbers P4C6N-041NT or P4C5N-046NT. These polypropylene resins have the features described in the preceding paragraph. These contact lens mold members can be made by purchasing or obtaining these polypropylene resins from Huntsman Corporation and injection molding the obtained polypropylene resin into contact lens mold members using conventional injection molding techniques. For example, these polypropylene resins can be injection molded into the present contact lens mold members using a melt temperature from 210° C. to 240° C.; a cooling water temperature from 20° C. to 50° C.; an injection time in the filling phase from 0.2 seconds to 1.5 seconds; a back pressure from 20 bars to 200 bars; a holding and packing pressure from 50% to 150% of the peak injection pressure. First and second mold members can be placed together, such as press-fit together, to form the present contact lens mold assemblies.

Accordingly, aspects of the present invention include contact lenses and methods of using and making contact lenses that have enhanced surface quality relative to identically produced lenses and methods involving a thermoplastic polyolefin resin having a materially significant melt flow rate, which may be referred to as a comparative class of lenses. In specific aspects of the present invention, the enhanced surface quality characteristics include a decrease in lens defects, which can be measured by quantifying a decrease in depth and/or length values of surface imperfections or textures of the produced lenses compared to the comparative class of lenses. In a preferred embodiment, the enhanced surface quality comprises a decrease of the depth of the surface defects compared to the comparative class of lenses. For example, the present contact lenses have surfaces with textures having a peak-to-valley distance from about 0 micrometers to less than 0.18 micrometers.

The foregoing contact lens mold assembly can comprise a polymerizable lens precursor composition or a polymerized lens product located between the first and second mold members, such as in a lens shaped cavity formed by the first and second mold members. The polymerizable lens precursor composition can comprise a silicone containing material, a HEMA containing material, and combinations thereof.

The following non-limiting examples illustrate certain aspects of the present invention.

EXAMPLE 1 (Comparative)

A commercial quantity (10,000) of soft hydrogel contact lenses, similar in composition to the Biomedics™ 55 contact lenses sold by CooperVision Inc. (ocufilcon D), are produced using conventional cast molding processing. The molds are made of a polypropylene resin sold by Fina under the tradename Fina PPH 3066. This resin does not include a nucleating agent. The melt flow rate of this polypropylene resin is 1.9 g/10 min.

The lenses produced are associated with an undesirable number of surface defects or imperfections, such as waves, and orange peeling texture, also known as mottling, as well as other surface defects or imperfections. These imperfections are visibly identifiable using conventional methods and devices, including magnifying instruments or lens inspection equipment. FIG. 2 includes a series of pictures illustrating a number of the surface imperfections of contact lenses, which occur using this polypropylene resin as the mold material. As can be seen in FIG. 2, many of these surface imperfections are quite severe. It should be noted that the defects shown in FIG. 2 are other than holes, chips and tears in the lenses.

All of the lenses shown in FIG. 2 result in inferior optical quality and inferior vision. Since there can be a relatively large number of lenses with such surface defects (e.g., about 30% of the lenses are categorized as having wavy surface texture or orange peel surface texture), the defective lenses lower customer satisfaction and adversely affect product competitiveness. The defects are identified visually using a knife edge optical system, as understood by persons of ordinary skill in the art, at a magnification of 28×. The sensitivity of the surface defect identification is dependent on the resolution of the magnifying device, as understood by persons of ordinary skill in the art.

EXAMPLE 2

Example 1 is repeated except that the molds are made of a nucleated polypropylene resin provided by Huntsman under the tradename P4C6N-041NT. This resin has a melt flow rate of 35 g/10 min, as determined using the ASTM D1238 test method.

The lenses produced have a reduced incidence of (fewer) surface imperfections than the lenses produced in Example 1. For example, the lenses for Example 2 with imperfections is decreased or reduced by at least 90% or at least 95% relative to the lenses of Example 1. In other words, contact lenses produced using the Huntsman P4C6N-041NT polypropylene resin can be produced with an acceptability rate of at least 90% or at least 95%, that is at least 90% or at least 95% of the contact lenses meet manufacturing inspection criteria and are packaged for further processing, such as sterilization and distribution. It can also be understood that the contact lenses obtained from the present molds have a correspondingly lower surface defect rate, such as surface textures that have the visual appearance of waves or orange peel.

In addition, the severity of the imperfections in the lenses of Example 2, when such defects did occur, is reduced relative to the severity of the imperfections of the lenses of Example 1. For example, as measured by the depth and/or the length of a surface imperfection, the severity of the average surface imperfection of the lenses of Example 2 is decreased or reduced by at least 90% or at least 95% relative to the lenses of Example 1. For example, the average depth of a surface imperfection of a batch of lenses of Example 2 that have surface imperfections can be about 10% or less, such as 5%, compared to the average depth of a surface imperfection of a batch of lenses of Example 1 that have surface imperfections. In addition, the average length of a surface imperfection of a batch of lenses of Example 2 that have surface imperfections can be about 10% or less, such as 5%, compared to the average length of a surface imperfection of a batch of lenses of Example 1 that have surface imperfections.

FIG. 3 includes a series of pictures of a representative number of lenses produced in accordance with Example 2. No lenses that are produced in accordance with Example 2 have surface imperfections more numerous or more severe than do the lenses shown in FIG. 3.

EXAMPLE 3

Example 1 is repeated except that the molds are made of a nucleated polypropylene resin provided by Huntsman under the tradename P4C5N-046NT. This resin has a melt flow rate of 20 g/10 min, as determined using the ASTM D1238 test method.

The lenses produced have a reduced incidence of (fewer) surface imperfections than the lenses produced in Example 1. For example, the lenses for Example 3 with imperfections is decreased or reduced by at least 90%, or at least 95%, relative to the lenses of Example 1. In other words, contact lenses produced using the Huntsman P4C5N-046NT polypropylene resin can be produced with an acceptability rate of at least 90%, or at least 95%, that is at least 90% or at least 95% of the contact lenses meet manufacturing inspection criteria and are packaged for further processing, such as sterilization and distribution. It can also be understood that the contact lenses obtained from the present molds have a correspondingly lower surface defect rate, such as surface textures that have the visual appearance of waves or orange peel.

In addition, the severity of the imperfections in the lenses of Example 3, when such defects did occur, is reduced relative to the severity of the imperfections of the lenses of Example 1. For example, as measured by the depth and/or the length of a surface imperfection, the severity of the average surface imperfection of the lenses of Example 3 is decreased or reduced by at least 90% or at least 95% relative to the lenses of Example 1. For example, the average depth of a surface imperfection of a batch of lenses of Example 3 that have surface imperfections can be about 10% or less, such as 5%, compared to the average depth of a surface imperfection of a batch of lenses of Example 1 that have surface imperfections. In addition, the average length of a surface imperfection of a batch of lenses of Example 3 that have surface imperfections can be about 10% or less, such as 5%, compared to the average length of a surface imperfection of a batch of lenses of Example 1 that have surface imperfections.

FIG. 4 includes a series of pictures of a representative number of lenses produced in accordance with Example 3. No lenses that are produced in accordance with Example 3 have surface imperfections more numerous or more severe than do the lenses shown in FIG. 4.

The polypropylene resins used in Examples 2 and 3, in accordance with the present invention, have better melt flow properties and are easier to process into contact lens molds than is the polypropylene resin used in Example 1. In addition, the polypropylene resins used in Examples 2 and 3 have passed all tests including, without limitation, processability tests, leachability tests, cytotoxicity tests (on the lenses produced) and clinical performance tests (on the lenses produced). The Example 2 and 3 resins have resulted in better mold surface quality and better contact lens surface quality relative to the Example 1 resin. In addition, the Example 2 and 3 resins advantageously require reduced processing temperature and pressure, and may provide for reduced cycle time relative to the Example 1 resin.

While this invention has been described with respect to various specific examples and embodiments, it is to be understood that the invention is not limited thereto and that it can be variously practiced within the scope of the following claims.

What is claimed is:

1. A method of producing soft cast-molded contact lenses having reduced optical distortion, the method comprising:
    providing first and second mold members structured to be assembled together to form a lens-shaped cavity therebetween, each of the first and second mold members comprises a nucleated thermoplastic polyolefin resin having a melt flow rate in a range from about 20 g/10 min to about 40 g/10 min as measured using test method ASTM D1238 at conditions of 230° C. with a load of 2.06, wherein an amount of nucleating agent is about 0.1% to about 1.5% (wt/wt);
    providing a contact lens-forming composition in the cavity;
    forming a cast-molded contact lens product from the contact lens-forming composition in the cavity;
    removing the cast-molded contact lens product from the first and second mold members; and
    repeating the providing, placing, forming and removing steps a plurality of times to produce a plurality of soft cast-molded contact lens products having reduced optical distortion relative to an identically produced plurality of soft cast-molded contact lens products made using first and second mold members comprising a thermoplastic olefin resin having a melt flow rate of 1.9 g/10 min;
    wherein the reduced optical distortion of the lenses comprises a reduced number of lenses with optical distortions that are visually apparent at 28× magnification using a knife edge optical system, as determined using an interferometer and wavefront analysis.

2. The method of claim 1 wherein the placing and subjecting steps are repeated at least about 100 times.

3. The method of claim 1 wherein the plurality of soft cast-molded contact lens products are hydrogel contact lens products.

4. The method of claim 3 wherein the nucleated thermoplastic polyolefin resin is a nucleated thermoplastic polypropylene resin.

5. The method of claim 1 wherein the plurality of soft cast-molded contact lens products are silicone hydrogel contact lens products.

6. The method of claim 5 wherein the nucleated thermoplastic polyolefin resin is a nucleated thermoplastic polypropylene resin.

7. The method of claim 1 wherein the nucleated thermoplastic polyolefin resin is a nucleated thermoplastic polypropylene resin.

8. The method of claim 1 wherein the forming step comprises polymerizing the contact lens-forming composition.

9. The method of claim 1. wherein each of the first and second mold members have (i) a density of about 0.900 g/cm$^3$; (ii) a linear flow mold shrink from about 0.010 to about 0.020 in/in; (iii) a tensile strength of about 5600 psi; (iv) a tensile elongation at yield of about 8.0%; (v) a flexural modulus from about 200,000 psi to about 290,000 psi; or (vi) a Rockwell hardness of about 110, or combinations thereof.

10. The method of claim 9, wherein the first and second mold members comprise each of the features (i) through (vi).

11. The method of claim 1, wherein the removed contact lens product has an anterior surface and a posterior surface, and both surfaces are free of a surface texture having a peak-to-valley value of at least 0.18 micrometers.

12. The method of claim 1 wherein the optical distortions are surface defects of the contact lenses.

13. The method of claim 12 wherein the surface defects of the contact lenses are directly transferred from at least one of the first and second mold members during the forming step of the cast-molded contact lens.

* * * * *

UNITED STATES PATENT AND TRADEMARK OFFICE
CERTIFICATE OF CORRECTION

PATENT NO.         : 8,003,024 B2
APPLICATION NO.    : 11/855376
DATED              : August 23, 2011
INVENTOR(S)        : Li Yao et al.

It is certified that error appears in the above-identified patent and that said Letters Patent is hereby corrected as shown below:

In column 8, line 61, delete "MPDMS" and insert -- mPDMS --, therefor.

In column 18, line 24, in Claim 1, delete "2.06," and insert -- 2.16 kg --, therefor.

In column 18, line 64, in Claim 9, delete "claim 1." and insert -- claim 1, --, therefor.

Signed and Sealed this
Tenth Day of April, 2012

David J. Kappos
*Director of the United States Patent and Trademark Office*